United States Patent
Hoch et al.

(10) Patent No.: US 6,791,574 B2
(45) Date of Patent: Sep. 14, 2004

(54) METHOD AND APPARATUS FOR OPTIMIZED DISTORTION CORRECTION FOR ADD-ON GRAPHICS FOR REAL TIME VIDEO

(75) Inventors: Michael Hoch, San Jose, CA (US); Jim Kent, Powell, OH (US)

(73) Assignees: Sony Electronics Inc., Park Ridge, NJ (US); Sony Corporation, Tokyo (JP)

( * ) Notice: Subject to any disclaimer, the term of this patent is extended or adjusted under 35 U.S.C. 154(b) by 470 days.

(21) Appl. No.: 09/942,091

(22) Filed: Aug. 28, 2001

(65) Prior Publication Data

US 2002/0044153 A1 Apr. 18, 2002

Related U.S. Application Data (60) Provisional application No. 60/311,301, filed on Aug. 10, 2001, and provisional application No. 60/228,907, filed on Aug. 29, 2000.

(51) Int. Cl.[7] .................................................. G09G 5/00
(52) U.S. Cl. ................................. 345/647; 348/207.99
(58) Field of Search ................................. 345/629, 630, 345/632, 647; 348/207.99, 335, 239; 382/254

(56) References Cited

U.S. PATENT DOCUMENTS 6,219,011 B1 * 4/2001 Aloni et al. .................. 345/1.3

2003/0038892 A1 * 2/2003 Wang et al. ................. 348/461

* cited by examiner

*Primary Examiner*—Matthew Luu
(74) *Attorney, Agent, or Firm*—Haverstock & Owens LLP (57) ABSTRACT

An optimized method and apparatus for correcting for distortions in rendering add-on graphics within a streaming video feed comprising receiving a streaming video feed captured using a real camera, including an image frame capturing an image of a real asset having a size and a position within the image frame, the image frame being captured from a particular view point and having a particular field of view, the real camera introducing a plurality of measurable image distortions into the image frame, receiving set of camera instrumentation sensors data corresponding to the view point, the field of view, distortion parameters of the real camera, creating a virtual camera, generating add-on graphics having a size and an insertion position within the image frame, creating a first distortion grid having a first set of coordinate values, creating a second distortion grid having a second set of coordinate values wherein the second set of coordinate values are derived from the first set of coordinate values, using the second grid to distort the add-on graphics for image distortion, and compositing the distorted add-on graphics with the image frame.

43 Claims, 6 Drawing Sheets

METHOD AND APPARATUS FOR OPTIMIZED DISTORTION CORRECTION FOR ADD-ON GRAPHICS FOR REAL TIME VIDEO

CROSS REFERENCE TO RELATED APPLICATIONS

The present application is related to and claims priority from the U.S. provisional application No. 60/228,907 entitled "OPTIMIZED DISTORTION CORRECTION FOR REAL TIME GRAPHICS" filed Aug. 29, 2000, and application No. 60/311,301, entitled "METHOD AND APPARATUS FOR DISTORTION CORRECTION AND DISPLAYING ADD-ON GRAPHICS FOR REAL TIME GRAPHICS" filed Aug. 10, 2001 by the same inventors, and incorporated herein by reference.

FIELD OF INVENTION

The present invention relates generally to graphics production techniques and more particularly to an optimized technique for correcting for the effects due to lens distortion.

BACKGROUND OF THE INVENTION

Previous techniques developed for inserting registered (aligned with the content of the video) graphics into a streaming video feed is based on rendering and processing the add-on graphics on the broadcaster's side. These techniques are typically targeted towards sports broadcasts and use a combination of camera tracking and object tracking technologies. In order to insert add-graphics registered to the content of a streaming video feed, the effects due lens distortion have to be accounted for. Large amounts of data manipulation is required for such registered add-on graphic insertion, and this amount of computation is prohibitively large for processing downstream on the consumer-level hardware. There is a need for an optimized technique for distortion correction required for registered add-on graphics that can be implemented on the consumer-level hardware.

SUMMARY OF THE PRESENT INVENTION

Briefly, one aspect of the present invention is embodied in an optimized method and apparatus for correcting for distortions in rendering add-on graphics within a streaming video feed comprising receiving a streaming video feed captured using a real camera, including an image frame capturing an image of a real asset having a size and a position within the image frame, the image frame being captured from a particular view point and having a particular field of view, the real camera introducing a plurality of measurable image distortions into the image frame, receiving set of camera instrumentation sensors data corresponding to the view point, the field of view, distortion parameters of the real camera, creating a virtual camera, generating add-on graphics having a size and an insertion position within the image frame, creating a first distortion grid having a first set of coordinate values, creating a second distortion grid having a second set of coordinate values wherein the second set of coordinate values are derived from the first set of coordinate values, using the second grid to distort the add-on graphics for image distortion, and compositing the distorted add-on graphics with the image frame.

The advantages of the present invention will become apparent to those skilled in the art upon a reading of the following descriptions and study of the various figures of the drawings.

DETAILED DESCRIPTION OF THE PREFERRED EMBODIMENT

The current generation of Digital Television (DTV) receivers, primarily cable and satellite Set-Top Boxes (STB), generally offer limited resources to applications. From a manufacturer's perspective, the goal has been building low-cost receivers comprised of dedicated hardware for handling the incoming MPEG-2 transport stream: tuning and demodulating the broadcast signal, demultiplexing and possibly decrypting the transport stream, and decoding the Audio Video (AV) elementary streams. Within the software found on a DTV receiver, often called middleware, one of the main components is the presentation engine. These presentation engines perform the function of processing the elementary AV stream as well as rendering and compositing add-on graphics to be inserted into the streaming video feed. The processing performed by the presentation engine may include distortion correction necessary for inserting add-on graphics registered to a real asset in a streaming video feed.

Figure 1:
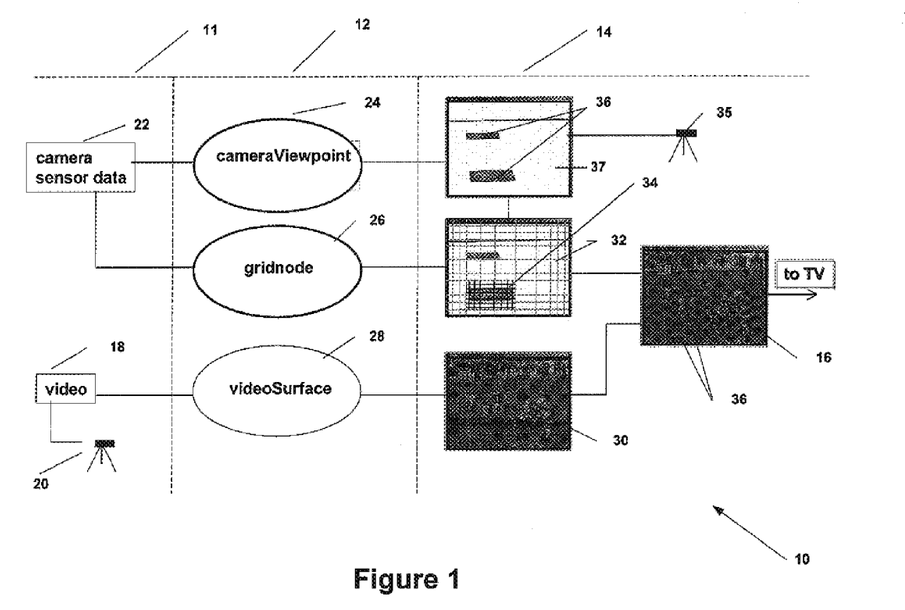
FIG. 1 illustrates a data flow diagram of the data processing by typical STB receiver as disclosed by the present invention.

FIG. 1 illustrates a data flow diagram of the data processing by a typical STB receiver as disclosed by the present invention. The video feed and a corresponding data stream is collected and transmitted to the receiver's input stage 11. In the processing stage 12 of the presentation engine 10, data is processed by a presentation engine 10 using a declarative markup language. At the output stage 14, data is processed and a rendered graphics are composited with a frame of streaming video feed as shown in the composite scene 16.

Looking at the input stage 11 of the presentation engine 10, the video feed 18 generated by real cameras at the event site represented here by the camera 20, and the corresponding camera instrumentation data 22 are received and demultiplexed by the modules of the Set Top Box (STB) receiver not shown here. Prior to entering the input stage 11 of the presentation engine 10, the video feed 18 generated by the cameras 20 at the event site and the corresponding camera instrumentation data 22 are received, tuned by a tuner module, demultiplexed by a demux module and decoded by a MPEG-2 decoder module.

Most digital television broadcast services, whether satellite, cable, or terrestrial, are bases on the MPEG-2 standard. In addition to specifying audio/video encoding, MPEG-2 defines a transport stream format consisting of a multiplex of elementary streams. The elementary streams can contain compressed audio or video content, "program specific information: describing the structure of the transport stream, and arbitrary data. Standards such as DSM-CC and the more recent ATSC data broadcast standard give ways of placing IP datagrams in elementary data streams. Although the present invention is implemented on a MPEG-2 platform partially because it is the more prominent standard currently used digital television signal transmission, it would be apparent to on skilled in the art that the present invention may be used with standards other than MPEG-2.

After demultiplexing and decoding of the video feed 18 and the camera instrumentation data 22, at the input stage 11 of the presentation engine 10, appropriate parameters are collected and corresponding values are passed to a cameraViewpoint 24 node and a gridnode 26 node, or alternatively to the dataReader and viewpoint nodes, and a gridnode 26 node. The video feed 18 is accepted and processed by the videoSurface node 28.

In practicing the present invention, a declarative markup language such as the Virtual Reality Markup Language (VRML) may be used to implement the concepts of the present invention. It would be apparent to one skilled in the art that any number of declarative markup languages including but not limited to languages such as HTML and XML may be used to practice the present invention. VRML is a web-oriented declarative markup language well suited for 2D/3D graphics generation and thus it is a suitable platform for implementing the teaching of the present invention.

In a declarative markup language such as the VRML, nodes describe shapes and their properties in the "world" being rendered. Individual nodes describe shapes, colors, lights, viewpoints, how to orient shapes, animation timers, sensors interpolators and so on. Nodes generally contain the node type, and a set of fields. Fields define the attributes of a node such as height, and color of the object to be rendered.

Enhancements that are registered to real assets within a video feed require placement that is correlated with objects in the video. Since current camera and object tracking systems may provide the data necessary for accurate graphical insertions of add-on graphics registered to the content of the video feed, in the present invention new nodes have been developed that include data fields for accepting camera instrumentation data allowing a declarative representation of the parameters used in rendering camera-aligned overlay graphics or add-on graphics. The camera tracking equipment may use encoders to read parameters such as the current pan, tilt and twist of the real camera 20 as well as the zoom level (camera tracking data 22) corresponding to a particular frame of the streaming video feed 18. Additionally, if the real camera 20 is mobile, GPS tracking may be used to supply data on the physical location of the real camera at each point in time. The add-on graphics 36 are rendered at the appropriate position and size using a virtual camera 35, and thereafter composited with the real scene.

However, geometric correction that accounts for lens distortion and optical center shift is often not applied due to the increased processing cost. The correction becomes necessary if graphical insertion of objects that are aligned with the content of the video feed 18 is desired. This correction becomes especially important if one has, for example, real objects sitting on virtual objects. Without lens distortion correction, real objects can appear to slide over the virtual set as the camera pans or zooms.

Looking at the processing stage 12 of the presentation engine 10, the values of the camera instrumentation (sensor) data 22 are used by the CameraViewpoint node 24 to drive a virtual camera 35. The virtual camera 35 renders a virtual scene 37 and graphics 36 of the appropriate size and at the appropriate position corresponding to the real camera's view point for that frame. The values corresponding to the viewpoint of the real camera 20 and the lens distortion values of the real camera 20 are passed as parameters to the corresponding fields of the CameraViewpoint node and drive the virtual camera's 35 viewpoint to correspond to that of the real camera 20. Alternatively, a dataReader node accepts the real camera sensor data 22 and passes the appropriate parameters to the viewpoint node which in turn drives the virtual camera's 35 viewpoint to correspond to that of the real camera 20. A viewpoint is a predefined viewing position and orientation in a virtual or real world, like a recommended photograph location at a tourist attraction. The location and viewing direction for the viewpoint is specified by the parameters of the viewpoint node or the CameraViewpoint node 24. These parameters are used to correspond the virtual camera's 35 view point to that of the real camera 20.

The video feed 18 is used by the VideoSurface node 28 to render the real scene as texture for that particular frame, as shown in video surface scene 30. Some declarative markup languages including VRML supports a MovieTexture primitive for presenting video clips, but streaming video feed from a broadcast is not directly supported. In one embodiment of the present invention a new level of abstraction to support video synthesis, called surfaces has been introduced. By using this abstraction, the presentation engine 10 architecture enables arbitrary marking engines (e.g., video, HTML, Flash™) to render into a scene at appropriate frame rate without burdening other elements (e.g., a 5 frames/sec animation on one surface would not prevent video on another surface from playing at 30 fps). In the example of the present embodiment, a MovieSurface node is introduced and used to control and display video. A subclass of the MovieSurface node named VideoSurface is used to implement the processing of live or streaming video feed such as the DTV broadcast of the racing event of present example. The VideoSurface node includes a videoSource field and a VideoResolution field used to support a broadcast or live video feed as opposed to a locally stored video.

The VideoSource field indicates where the presentation engine browser is receiving video input. The possible values of the field are hardware dependent. For the particular platform illustrated in the example of the present embodiment, there are three possibilities: ATSC, COMPOSITE, and SDI (Serial Digital Interface). In the case of ATSC, the decoded video is extracted directly from a receiver/tuner card and displayed onto the surface. In this configuration it is assumed that the presentation engine's 10 browser and the DTV receiver reside in the same machine or set top box. Alternatively, one can envision a two-box setup, where the first box is a DTV receiver and the second box holds the presentation engine 10. The decoded video stream is sent from the DTV receiver to the compositor via either the COMPOSITE video port or the SDI video port.

The VideoResolution field specifies the dimensions of the extracted video. In the example of present embodiment, the presentation engine has the capability of handling full-sized NTSC video of 720×480 at 30 fps. The ATSC tuner card is able to down filter any of the ATSC video resolutions to 720×480.

In a preferred embodiment of the present invention, a node named Gridnode 26 is used to correct distortions introduced by the real camera lens. The Gridnode 26 uses camera instrumentation data 22 to correct for the radial lens distortion and optical center shift of the real camera lens. This correction is needed because in order to do frame aligned graphics insertion, it is necessary to correct for the effects of radial lens distortion and optical center shift inherent in every real camera 20. Otherwise, the inserted graphics would not accurately register to the to the real object and would appear to shift with respect to it.

In the example of the present invention, the camera instrumentation data 22 is used by the Gridnode node 26 to correct for the real camera's 20 lens distortion corresponding to the patch grid 34. The coordinate values of the patch grid 34 may be derived by interpolation from the coordinate values of the full frame or whole grid 32. The processing of the related data and pixels for each full frame of the video feed 18 requires a large amount of manipulation and data computation. The present invention teaches an optimized method of distortion correction based on using a patch grid 34 instead of a the whole grid 32.

Looking at the output stage 14 of the presentation engine 10, the CameraViewpoint node 24 drives the virtual camera 35 to produces a virtual scene 37 and add-on graphics 36 within it. The add-on graphics 36 are to be inserted into the streaming video feed as shown in 16. The Gridnode node 26 uses parameters corresponding to the values of the real camera's lens distortion from the camera sensor data feed 22 and creates the full frame distortion grid 32 and the patch grid 34. The distortion grid 32 and the patch grid 34 are then used to modify the rendered graphics 36 by adjusting them, so that the rendered graphics 36 are distorted in the same way as the real scene 30. The rendered graphics are laid on the distortion grid 32 and distorted in the appropriate amount corresponding to the distortion parameters of the real camera lens. In the present example, the distortion grid 32 is adjusted for changes in the distortion parameters by correspondingly adjusting its coordinates. The distortion grid 32 introduces appropriate distortion of the virtual scene surface 37 and the add-on graphics 36 when the virtual scene 37 and the add-on graphics 36 within it are laid on it. The distortion grid 32 is used as geometry to distort the virtual scene 37 and the rendered graphics 37 in it.

The presentation engine 10 then composites the corrected add-on graphics 36 with the real scene 30 to form the composite scene 16 which is then displayed on the DTV screen. Once the rendered graphics 36 is corrected for the radial lens distortions by using the whole grid 32 and the patch grid 34, the corrected graphics is composited with the real scene frame 30 to form the composite frame 16 with the inserted graphics 40.

Some classes of enhancements require placement of graphics that is correlated with objects in the video. Since current camera and object tracking systems provide the data required for accurate graphical insertions registered with the video, new nodes to be used in a declarative representation language such as VRML have been developed that can support these data fields to allow a declarative representation for camera-aligned overlay graphics The camera tracking equipment, well known in the art, typically uses encoders to read the current pan, tilt, and twist of the camera, as well as, the zoom level, i.e., the field of view. Furthermore, the position of the camera is tracked in order to reproduce a virtual camera that corresponds to the real camera.

The next step is to render the graphics at the appropriate position and size using the virtual camera shot. However, geometric correction that accounts for lens distortion and optical center shift is often not applied because of the increased processing cost. When graphical objects that are aligned with the content of the video feed are inserted, the correction becomes necessary. The present invention applies a correction technique that is related the well-known techniques of rectification and geometric correction, which are normally applied on a per-image basis. The present invention introduces a two-pass rendering technique that renders the scene that is to be used as a texture in the second pass. This texture is then corrected for distortion parameters (radial distortion and optical center shift) and finally composited with the current video image. Some current virtual set systems perform this correction since it becomes especially important if one has, for example, real objects sitting on virtual objects. Without lens distortion correction, real objects can appear to slide over the virtual set as the camera pans or zooms.

Figure 2:
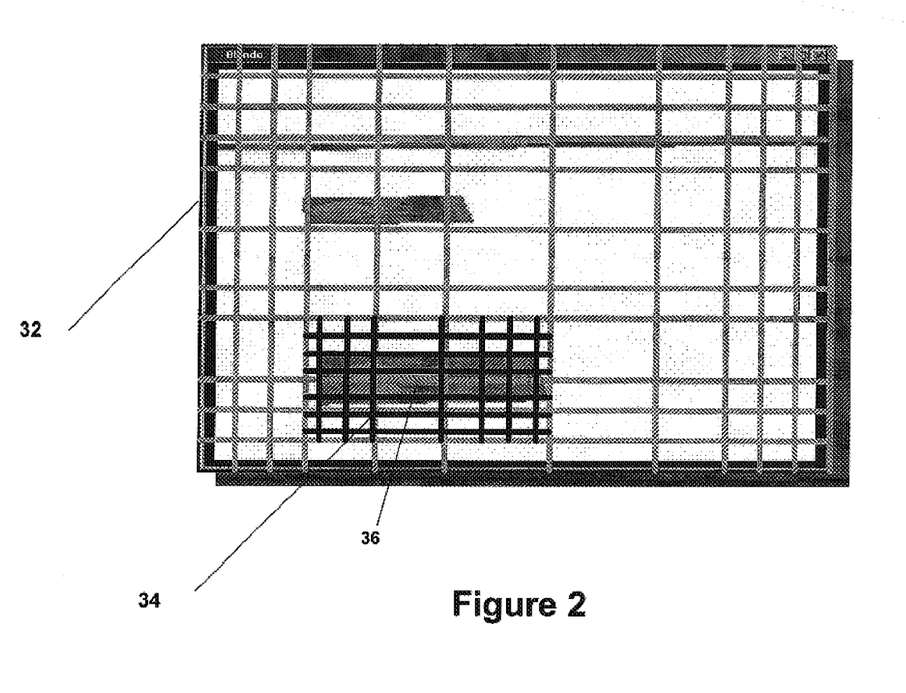
FIG. 2 illustrates a patch grid within the lattice of a full size distortion grid.

FIG. 2 illustrates a patch grid 34 within the lattice of the full size Gridnode 32. The gridnode is used as the geometry upon which the add-on graphics and the video frame scene are composited as shown in scene 16 in FIG. 1. Consumer level hardware lack the needed processing power to do things such as hardware-acceleration for graphics like alpha-blending, and still leave enough CPU cycles for other interactivity. Since in the typical case, the graphics or assets to be added are smaller in size than the video feed, i.e. the ratio of the pixels necessary to represent the assets within the video to the pixels necessary to represent the full frame of the video is less than one, the computation time required for distortion correction can be reduced considerably by applying an optimization technique. To overcome the bottleneck caused by the large amount of computation required to blend the video layer with the add-on graphics, a technique to limit the actual rendering to single patches or region of interest around the graphics to be added is taught by the present invention. A Region Of Interest (ROI) is first determined, and the distortion calculations are limited to the ROI areas only. The Gridnode defines a regular grid of vertices that can be used as control points in a generic way, i.e. independent from geometry. Gridnode, itself, uses an attached IndexedFaceSet node, so that the control points of the base node can be used to modify the geometry. This modification is repeated for the patch grid based on the location of the patch grid with respect to the whole grid.

In a declarative representation language such as VRML, primitive geometry nodes can be used to create a variety of simple shapes, but they are insufficient when your goal is to create more complex shapes. A face is a flat shape whose perimeter traces a closed path through a series of coordinates in your 3-D world. A face set is a group of these faces specified by an IndexedFaceSet node. By arranging many adjacent sets of faces in an IndexedFaceSet node, you can construct complex faceted surfaces.

As shown in FIG. 2, the full frame distortion grid 32 is created using the gridnode node 26. The distortion grid's 32 coordinates are adjusted based on the distortion parameters from the camera sensor data 22. In one embodiment of the present invention, within the full frame distortion grid 32, the gridnode node 26 creates patch grids whose size and position are based on the size and position of the assets within the video frame, as well as the size and position of insertion of the add-on graphics 36. The coordinates of the patch grid 34 are at least partially derived by interpolation from the coordinates of the full frame distortion grid 32. Depending on the position of insertion of the add-on graphics 36, the coordinates of the patch grid 34 change.

Figure 3:
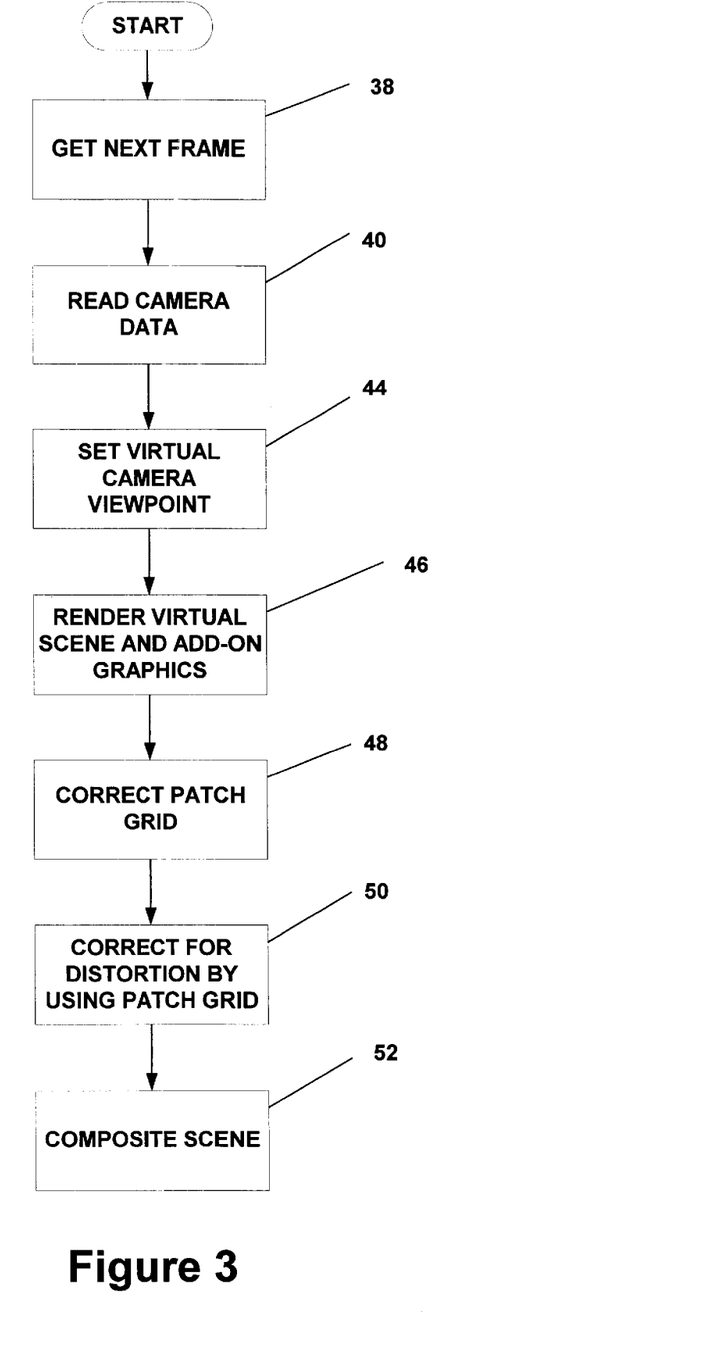
FIG. 3 illustrates a data flow diagram within the presentation engine.

FIG. 3 illustrates a data flow diagram within the presentation engine 10. In operation 38, the next frame of the streaming video feed 18 is obtained. In operation 40, the camera instrumentation data 22 is read. In one embodiment of the present invention, a dataReader node is used to read the camera sensor data 22. In an alternative embodiment, the CameraViewpoint node 24 reads the distortion parameters of the real camera from the camera sensor data 22. In operation 44, the CameraViewpoint node 24 or in an alternative embodiment, the VRML viewpoint node sets the virtual camera's view point or field of view of corresponding to the field of view of the real camera. In operation 46, the virtual camera 35 renders the virtual scene 37 and the add-on graphics 36 (virtual assets). In operation 48, the patch grid 34 of the optimized gridnode patch is corrected based on the location of the patch grid within the whole grid. In operation 50, the gridnode patch 34 is used as geometry with the appropriate distortion corresponding to the real camera lens distortion. The add-on graphics 36 is laid on the patch grid 34 as texture and distorted in the appropriate way so that the add-on graphics' 36 distortions match that of the video feed 20. The distorted add-on graphics 36 is added to the real scene 30 to form the composite scene 16 in step 52.

Figure 4:
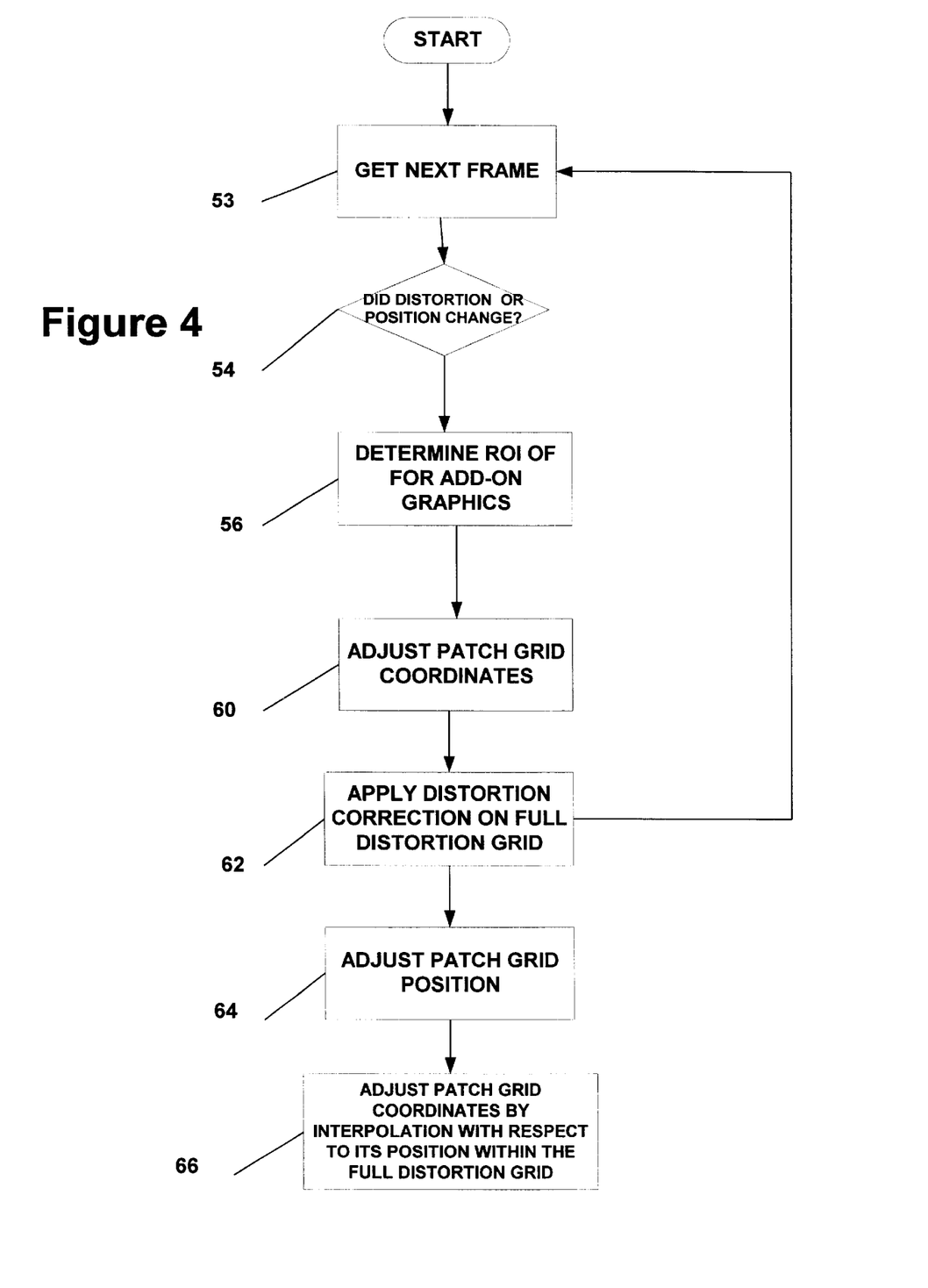
FIG. 4 illustrates a detailed flow diagram of the process of using the optimized distortion correction technique in rendering add-on graphics

FIG. 4 illustrates a detailed flow diagram of the process of using the optimized distortion correction technique in rendering add-on graphics 36. In operation 53, the next frame of the streaming video feed is retrieved. In operation 54, the presentation engine 10 compares the new distortion parameters obtained from the camera sensor data 22 to the values of the distortion parameters for the current frame. If distortion parameters of from the camera sensors data 22 have changed for the new frame, a new distortion patch grid 34 and possibly a new full distortion grid 32 may have to be created. The distortion parameters may include at least one of distortion coefficient, optical center shift in the x direction and the y direction as well as the distortion coefficient. Each real camera lens has unique distortion parameters. Furthermore, the values of the distortion parameters change based on changes in the focus and field of view of the lens. In operation 56, a Region Of Interest (ROI) for the add-on graphics 36 to be rendered is determined. The ROI determination is based on the size of the graphics to be added and its insertion position within the video frame 30. The ROI determination operation involves gathering data and does not adjust the patch location to correspond to the ROI. In an alternative embodiment, the patch grid 34 position may be adjusted in the same operation as determining the ROI region. Once the ROI is determined, in step 60 the patch grid 34 lattice and texture size is adjusted to correspond to the size of the add-on graphics 36 (virtual asset) to be rendered.

In operation 62, the new distortion parameters are applied to the full frame grid (the original grid) 32. The texture coordinates of the gridnode get adjusted so that any image that gets mapped onto it will get distorted. The distortion parameters su, sv and k drive this process. Su an sv are optical center shifts in the x and y directions respectively, i.e. they offset all grid points (texture coordinates). K does a radial distortion so that it then looks like the composite graphic scene 16 has been taken by the real camera 20. Finally, the texture coordinates adjustment make sure the image is stretched in the appropriate way to match what is recorded by the real camera 20.

In operation 64 the patch grid's 34 position is adjusted. The patch moves to wherever the asset is. And lastly, in step 66 the new patch grid is adjusted by interpolating from the coordinates of the full grid 32 with respect to the position of the patch on the original grid and the distortion parameters 56 of the original grid 32.

Figure 5:
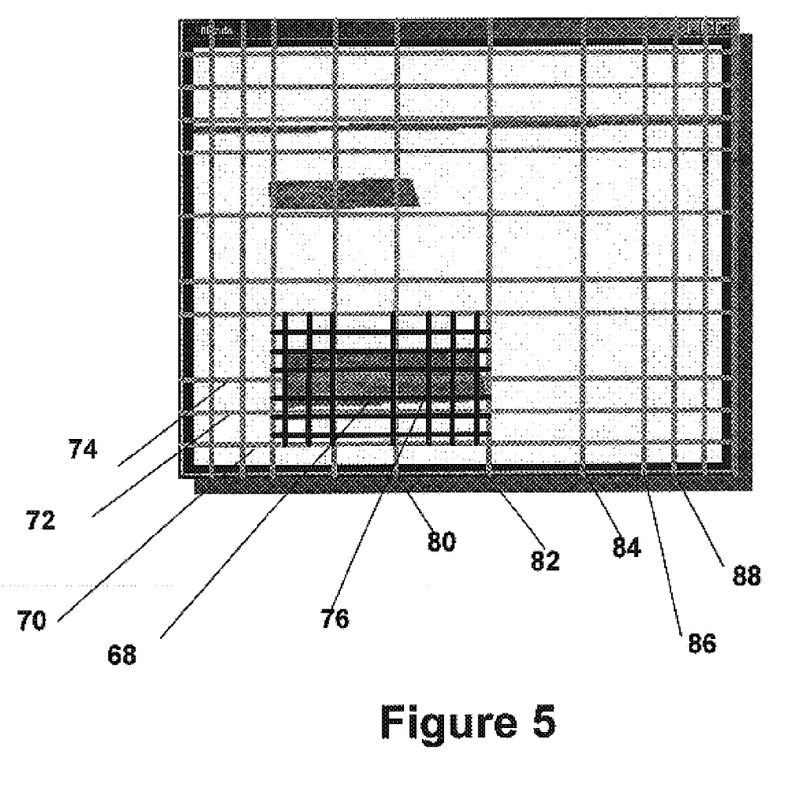
FIG. 5 is an illustration of the use of interpolation in determining the coordinates of a patch grid.

FIG. 5 is an illustration of the application of the interpolation techniques on the grid patch 34. The Gridnode texture coordinates are adjusted based on the location of the grid patch 34 within the full grid 32 (original grid). The Gridnode class gets derived from a base grid node (GrideBaseNode) which defines a regular grid of vertices that can be used as control points in a generic way, i.e. independent form geometry. The Gridnode, itself, uses an attached IndexedFaceSet, so that the control points of the base node can be used to modify the geometry. The patch grid 34 distortion is adjusted in respect to it's position within the full grid 32 (gridnode). The patch grid 34 has a rectangular grid like the full grid 32. However, the patch grid's lattice is adjusted (by interpolation of the original gridnode control points), so that it reflects the part of the original grid it is covering. The values of its coordinates may be interpolated using a standard technique, such as bilinear interpolation. It will be apparent to those skilled in the art, that any interpolation techniques other than the bilinear method may be used to calculate the patch grid coordinates. For example, in looking at FIG. 5, the value of the coordinate for the abscissa 68 may be interpolated from the values of the original grid abscissa such as 70 and 72 and 74 and other abscissa. Similarly, the coordinate values of the vertices 76 may be calculated from the values of the full frame (original) grid vertices such as 80, 82, 84, 86, 88 and so on.

The following is an illustrative algorithm for the optimized distortion correction method:

FOR each frame DO
  Step 0: adjust grid patch lattice and texture pixel to best represent asset to be rendered (only needed once per asset, and when asset size changes considerably);

tex_width=asset_width/grid_width * video_width+factor;

tex_height=asset_height/grid_height * video_height+factor;

patch_subdivision=min (5, grid_subdivision * asset_size/grid_size);

Step 1: adjust lattice of abstract gridnode to correct for distortion and optical center shift FOR ALL control points with coordinates (x, y) DO x=kappa * x+0.5−opticalCenterX;

y=kappa * y+0.5−opticalCenterY;

Step 2: adjust position of small patch to asset position being rendered;
  Step 3: adjust patch grid with respect to it's position on the gridnode FOR all patch grid texture control points with coordinates (xp, yp) DO
  Find nearest n grid coordinates (xi, yi)

xp=interpolation (x1, x2, . . . , xn);

yp=interpolation (y1, y2, . . . , yn);

Step 4: render grid patch and composite with current frame.

The present invention's optimized method of distortion correction allows the instrumented camera information to be processed downstream on the user side hardware, with limited capabilities. Downstream processing allows flexibility and possibility of user interactivity. However, the method of the present invention is equally applicable integration of graphics on the broadcaster side.

Figure 6:
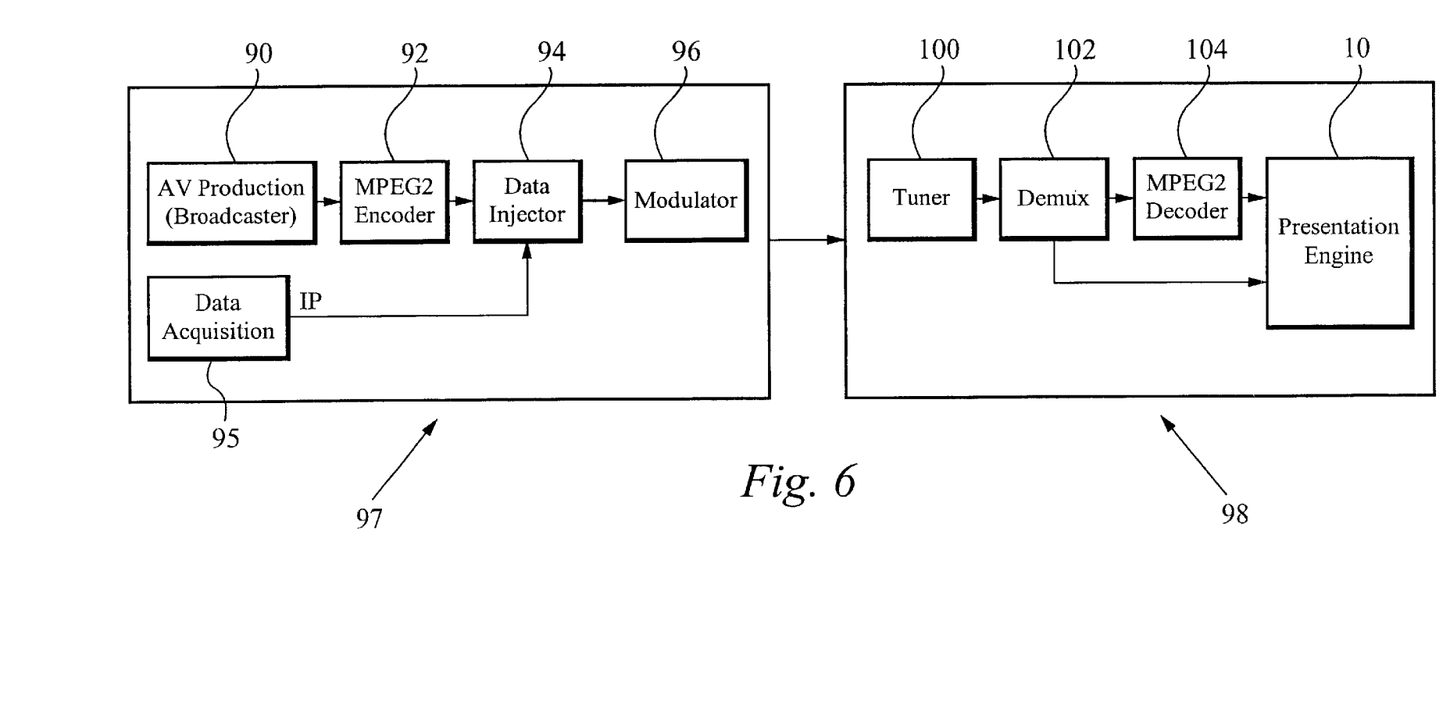
FIG. 6 illustrates a functional block diagram of transmission and reception systems for a Digital Television (DTV).

FIG. 6 shows the functional block diagram for a transmission and reception systems for a Digital Television (DTV). On the transmission side 97, the DTV production system is composed of AV Production module 90 corresponding to the television cameras 20 of FIG. 1 and the AV equipment processing the raw image. The AV signals from the AV production unit 90 (broadcaster) are fed into an MPEG-2 encoder 92 which compresses the AV data based on an MPEG-2 standard. Digital television broadcast services, whether satellite, cable or terrestrial transmission are based on the MPEG-2 standard. In addition to specifying audio and video encoding, MPEG-2 defines a transport stream format consisting of a multiplex of elementary streams. The elementary streams can contain compressed audio or video content, program specific information describing the structure of the transport stream, and arbitrary data. It will be appreciated by one skilled in the art that the teachings of the present invention are not limited to an implementation based on an MPEG-2 standard. Alternatively, the present invention may be implemented using any standard such as MPEG-4, DSM-CC or the Advanced Television System Committee (ATSC) data broadcast standard that allows for ways of placing IP datagrams in elementary streams. The generated and compressed AV data is inputted into a data injector 94, which combines the AV signals with the corresponding instrumentation data 22 of FIG. 1, coming from the data acquisition unit 95. The data acquisition module 95 handles the various real-time data sources made available to the broadcaster. In the example used with the present embodiment, the data acquisition module 95 obtains the camera tracking, car tracking, car telemetry and standings data feeds and converts these into Internet Protocol (IP) based packets which are then sent to the data injector 94. The data injector 94 receives the IP packets and encapsulates them in an elementary stream that is multiplexed with the AV elementary streams. The resulting transport stream is then modulated by the modulator 96 and transmitted to the receiver device via cable, satellite or terrestrial broadcast.

On the receiver side, a receiver 98 receives the transmitted combined AV/data signal. The presentation engine 10 resides on the receiver 98. Alternatively, the receiver 98 may be incorporated into a Digital television or a Personal Computer with a DTV card or be a part of Set Top Box (STB) receiver capable of interfacing with other such devices. Furthermore, the presentation engine 10 may include an integrated application module or use a stand alone application module to interface with a gaming engine.

The digital television signals may be delivered via cable or satellite or terrestrial broadcast. The receiving antenna delivers the signals to a receiver 98. As disclosed in the preferred embodiment of the present invention, the receiver 98, includes a tuner 100, a demultiplexer (Demux) 102 to demultiplex the incoming signal, a MPEG-2 Decoder 104 to decode the incoming signal, and a presentation engine 10. The presentation engine 10 may include an application module that interfaces with a gaming platform not shown here. Alternatively, the application module may be a stand alone gaming platform interfacing with the presentation engine 10 through a network. The presentation engine 10 processes the incoming AV signals and the corresponding data, and renders a composite image on the digital television.

Although the present invention has been described above with respect to presently preferred embodiments illustrated in simple schematic form, it is to be understood that various alterations and modifications thereof will become apparent to those skilled in the art. It is therefore intended that the appended claims to be interpreted as covering all such alterations and modifications as fall within the true spirit and scope of the invention.

What is claimed is:

1. A method of distorting add-on graphics to be composited with a streaming video feed comprising:

receiving a streaming video feed captured using a real camera, including an image frame capturing an image of a real asset having a size and a position within the image frame, the image frame being captured from a particular view point and having a particular field of view, the real camera introducing a plurality of measurable image distortions into the image frame;

receiving set of camera instrumentation data corresponding to the view point, the field of view, distortion parameters of the real camera;

creating a virtual camera;

generating add-on graphics having a size and an insertion position within the image frame;

creating a first distortion grid having a first set of coordinate values;

creating a second distortion grid having a second set of coordinate values wherein the second set of coordinate values are derived from the first set of coordinate values;

using the second grid to distort the add-on graphics for image distortion; and compositing the distorted add-on graphics with the image frame.

2. The method of claim 1 wherein the virtual camera renders the add-on graphics at a virtual view point and a virtual field of view corresponding to the view point and the field of view of the real camera.

3. The method of claim 1 wherein the size and the insertion position of the add-on graphics within the image frame corresponds to the size and the position of an image of a real asset within the image frame.

4. The method of claim 1 wherein the second distortion grid smaller than and within the first distortion grid.

5. The method of claim 4 wherein the size and insertion position of the second distortion grid within the first distortion grid corresponds to the size and insertion position of the add-on graphics within the image frame.

6. The method of claim 1 wherein the virtual camera, the first distortion grid and the second distortion grid are created using a declarative markup language.

7. The method of claim 6 wherein the declarative markup language is an extension of VRML.

8. The method of claim 1 wherein the camera instrumentation data corresponding to the view point and field of view of the real camera is used to set the view point and field of view virtual camera.

9. The method of claim 8 wherein the camera instrumentation data includes at least one of:

pan, tilt, twist, zoom level and image distortion parameters.

10. The method of claim 9 wherein the image distortion parameters include at least one of:

radial lens distortion and optical center shift in x and y direction.

11. The method of claim 1 wherein the deriving the second set of coordinate values from the first set of coordinate values is by interpolation.

12. The method of claim 11 wherein the interpolation technique used is a bilinear interpolation.

13. The method of claim 1 further comprising:

re-adjusting the size and position of the second distortion grid after applying the distortion parameters to the first set of coordinate values but before interpolating the second set of coordinate values.

14. An apparatus for distorting add-on graphics to be composited with a streaming video feed comprising:

means for receiving a streaming video feed captured using a real camera, including an image frame capturing an image of a real asset having a size and a position within the image frame, the image frame being captured from a particular view point and having a particular field of view, the real camera introducing a plurality of measurable image distortions into the image frame;

means for receiving set of camera instrumentation data corresponding to the view point, the field of view, distortion parameters of the real camera;

means for creating a virtual camera;

means for generating add-on graphics having a size and an insertion position within the image frame;

means for creating a first distortion grid having a first set of coordinate values;

means for creating a second distortion grid having a second set of coordinate values wherein the second set of coordinate values are derived from the first set of coordinate values;

means for using the second grid to distort the add-on graphics for image distortion; and means for compositing the distorted add-on graphics with the image frame.

15. The apparatus of claim 14 wherein the virtual camera renders the add-on graphics at a virtual view point and a virtual field of view corresponding to the view point and the field of view of the real camera.

16. The apparatus of claim 14 wherein the size and the insertion position of the add-on graphics within the image frame corresponds to the size and the position of an image of a real asset within the image frame.

17. The apparatus of claim 14 wherein the second distortion grid smaller than and within the first distortion grid.

18. The apparatus of claim 17 wherein the size and insertion position of the second distortion grid within the first distortion grid corresponds to the size and insertion position of the add-on graphics within the image frame.

19. The apparatus of claim 14 wherein the virtual camera, the first distortion grid and the second distortion grid are created using a declarative markup language.

20. The apparatus of claim 19 wherein the declarative markup language is an extension of VRML.

21. The apparatus of claim 14 wherein the camera instrumentation data corresponding to the view point and field of view of the real camera is used to set the view point and field of view virtual camera.

22. The apparatus of claim 21 wherein the camera instrumentation data includes at least one of:
pan, tilt, twist, zoom level and image distortion parameters.

23. The apparatus of claim 22 wherein the image distortion parameters include at least one of:
radial lens distortion and optical center shift in x and y direction.

24. The apparatus of claim 14 wherein the deriving the second set of coordinate values from the first set of coordinate values is by interpolation.

25. The apparatus of claim 24 wherein the interpolation technique used is a bilinear interpolation.

26. The apparatus of claim 14 further comprising:
re-adjusting the size and position of the second distortion grid after applying the distortion parameters to the first set of coordinate values but before interpolating the second set of coordinate values.

27. A computer program product embodied in a computer readable medium for distorting add-on graphics to be composited with a streaming video feed comprising:

code means for receiving a streaming video feed captured using a real camera, including an image frame capturing an image of a real asset having a size and a position within the image frame, the image frame being captured from a particular view point and having a particular field of view, the real camera introducing a plurality of measurable image distortions into the image frame;

code means for receiving set of camera instrumentation data corresponding to the view point, the field of view, distortion parameters of the real camera;

code means for creating a virtual camera;

code means for generating add-on graphics having a size and an insertion position within the image frame;

code means for creating a first distortion grid having a first set of coordinate values;

code means for creating a second distortion grid having a second set of coordinate values wherein the second set of coordinate values are derived from the first set of coordinate values;

code means for using the second grid to distort the add-on graphics for image distortion; and code means for compositing the distorted add-on graphics with the image frame.

28. The computer program product of claim 27 wherein the virtual camera renders the add-on graphics at a virtual view point and a virtual field of view corresponding to the view point and the field of view of the real camera.

29. The computer program product of claim 27 wherein the size and the insertion position of the add-on graphics within the image frame corresponds to the size and the position of an image of a real asset within the image frame.

30. The computer program product of claim 27 wherein the second distortion grid smaller than and within the first distortion grid.

31. The computer program product of claim 30 wherein the size and insertion position of the second distortion grid within the first distortion grid corresponds to the size and insertion position of the add-on graphics within the image frame.

32. The computer program product of claim 27 wherein the virtual camera, the first distortion grid and the second distortion grid are created using a declarative markup language.

33. The computer program product of claim 32 wherein the declarative markup language is an extension of VRML.

34. The computer program product of claim 27 wherein the camera instrumentation data corresponding to the view point and field of view of the real camera is used to set the view point and field of view virtual camera.

35. The computer program product of claim 34 wherein the camera instrumentation data includes at least one of:
pan, tilt, twist, zoom level and image distortion parameters.

36. The computer program product of claim 35 wherein the image distortion parameters include at least one of:
radial lens distortion and optical center shift in x and y direction.

37. The computer program product of claim 27 wherein the deriving the second set of coordinate values from the first set of coordinate values is by interpolation.

38. The computer program product of claim 37 wherein the interpolation technique used is a bilinear interpolation.

39. The computer program product of claim 27 further comprising:
re-adjusting the size and position of the second distortion grid after applying the distortion parameters to the first set of coordinate values but before interpolating the second set of coordinate values.

40. A system for distorting add-on graphics to be registered and composited with a streaming video feed comprising:

means for generating a streaming video feed;

means for measuring camera instrumentation data;

means for transmitting the streaming video feed and the camera instrumentation data down to a receiver;

means for receiving a streaming video feed captured using a real camera, including an image frame capturing an image of a real asset having a size and a position within the image frame, the image frame being captured from a particular view point and having a particular field of view, the real camera introducing a plurality of measurable image distortions into the image frame;

means for receiving set of camera instrumentation data corresponding to the view point, the field of view, distortion parameters of the real camera;

means for creating a virtual camera;

means for generating add-on graphics having a size and an insertion position within the image frame;

means for creating a first distortion grid having a first set of coordinate values;

means for creating a second distortion grid having a second set of coordinate values wherein the second set of coordinate values are derived from the first set of coordinate values;

means for using the second grid to distort the add-on graphics for image distortion; and means for compositing the distorted add-on graphics with the image frame.

41. A computer program product embodied in a computer readable medium for add-on graphics distortion comprising:

code means for receiving a streaming video feed captured using a real camera, including an image frame capturing an image of a real asset having a size and a position within the image frame, the image frame being captured from a particular view point and having a particular field of view, the real camera introducing a plurality of measurable image distortions into the image frame;

code means for receiving set of camera instrumentation data corresponding to the view point, the field of view, distortion parameters of the real camera;

code means for creating a virtual camera using a declarative markup language, said virtual camera generating add-on graphics having a size and an insertion position within the image frame, the virtual camera rendering the add-on graphics at a virtual view point and a virtual field of view corresponding to the view point and the field of view of the real camera, the size and the insertion position of the add-on graphics within the image frame corresponding to the size and the position of an image of a real asset within the image frame, the camera instrumentation data corresponding to the view point and field of view of the real camera being used to set the view point and field of view virtual camera;

code means for creating a first distortion grid and a second distortion grid smaller than and within the first distortion grid using the declarative markup language, the first distortion grid having a first set of coordinate values based on said camera instrumentation data, the second distortion grid having a second set of coordinate values based on the size and insertion position of the second distortion grid within the first distortion grid, the size and insertion position of the second grid corresponding to the size and insertion position of the add-on graphics within the image frame;

code means for using the second set of coordinate values to distort the add-on graphics for image distortion; and code means for compositing the distorted add-on graphics with the image frame.

42. A method for add-on graphics distortion comprising:

receiving a streaming video feed captured using a real camera, including an image frame capturing an image of a real asset having a size and a position within the image frame, the image frame being captured from a particular view point and having a particular field of view, the real camera introducing a plurality of measurable image distortions into the image frame;

receiving set of camera instrumentation data corresponding to the view point, the field of view, distortion parameters of the real camera;

creating a virtual camera using a declarative markup language, said virtual camera generating add-on graphics having a size and an insertion position within the image frame, the virtual camera rendering the add-on graphics at a virtual view point and a virtual field of view corresponding to the view point and the field of view of the real camera, the size and the insertion position of the add-on graphics within the image frame corresponding to the size and the position of an image of a real asset within the image frame, the camera instrumentation data corresponding to the view point and field of view of the real camera being used to set the view point and field of view virtual camera;

creating a first distortion grid and a second distortion grid smaller than and within the first distortion grid using the declarative markup language, the first distortion grid having a first set of coordinate values based on said camera instrumentation data, the second distortion grid having a second set of coordinate values based on the size and insertion position of the second distortion grid within the first distortion grid, the size and insertion position of the second grid corresponding to the size and insertion position of the add-on graphics within the image frame;

distorting the add-on graphics for image distortion using the second set of coordinate values to; and compositing the distorted add-on graphics with the image frame.

43. An apparatus for add-on graphics distortion comprising:

means for receiving a streaming video feed captured using a real camera, including an image frame capturing an image of a real asset having a size and a position within the image frame, the image frame being captured from a particular view point and having a particular field of view, the real camera introducing a plurality of measurable image distortions into the image frame;

means for receiving set of camera instrumentation data corresponding to the view point, the field of view, distortion parameters of the real camera;

means for creating a virtual camera using a declarative markup language, said virtual camera generating add-on graphics having a size and an insertion position within the image frame, the virtual camera rendering the add-on graphics at a virtual view point and a virtual field of view corresponding to the view point and the field of view of the real camera, the size and the insertion position of the add-on graphics within the image frame corresponding to the size and the position of an image of a real asset within the image frame, the camera instrumentation data corresponding to the view point and field of view of the real camera being used to set the view point and field of view virtual camera;

means for creating a first distortion grid and a second distortion grid smaller than and within the first distortion grid using the declarative markup language, the first distortion grid having a first set of coordinate values based on said camera instrumentation data, the second distortion grid having a second set of coordinate values based on the size and insertion position of the second distortion grid within the first distortion grid, the size and insertion position of the second grid corresponding to the size and insertion position of the add-on graphics within the image frame;

means for using the second set of coordinate values to distort the add-on graphics for image distortion; and means for compositing the distorted add-on graphics with the image frame.

* * * * *